United States Patent [19]
Sumida

[11] 3,830,329
[45] Aug. 20, 1974

[54] CRASH SENSOR
[75] Inventor: Sizuo Sumida, Hiroshima, Japan
[73] Assignee: Toyo Kogyo Company Limited, Hiroshima, Japan
[22] Filed: May 8, 1972
[21] Appl. No.: 251,209

[30] Foreign Application Priority Data
May 10, 1971 Japan.............................. 46-37234

[52] U.S. Cl................. 180/91, 280/150 AB, 293/1
[51] Int. Cl............................................. B60r 21/08
[58] Field of Search................ 180/91; 280/150 AB; 73/517; 307/318; 293/86; 200/DIG. 10

[56] References Cited
UNITED STATES PATENTS

| | | | |
|---|---|---|---|
| 1,207,126 | 12/1916 | Benson | 200/DIG. 10 |
| 2,931,665 | 4/1960 | Sandor | 280/150 AB |
| 2,944,804 | 7/1960 | Persson et al. | 73/517 R X |
| 3,146,014 | 8/1964 | Kroell | 293/86 X |
| 3,225,695 | 12/1965 | Kapp et al. | 307/318 X |
| 3,483,759 | 12/1969 | Venetos | 73/517 R |
| 3,495,675 | 2/1970 | Hass et al. | 180/91 |
| 3,622,974 | 5/1970 | Best | 280/150 |
| 3,654,412 | 4/1972 | Haruna | 180/91 X |

Primary Examiner—David Schonberg
Assistant Examiner—Jack D. Rubenstein
Attorney, Agent, or Firm—Sughrue, Rothwell, Mion, Zinn & Macpeak

[57] ABSTRACT

The crash sensor has a damper mounted to the vehicle body or bumper for absorbing the energy upon collision. The damper has a cylinder and a piston, which sealingly enclose various gas or liquid for effecting damping. The means for sensing the collision has a coil and a magnet, which are connected to the cylinder and piston of said damper. When the vehicle collides, the crash, attenuated by the damper upon collision, is indicated by means of a voltage produced by the coil and magnet with the strength of the crash indicated by the value of the voltage which is proportional to the speed at which the coil crosses the magnetic flux of the magnet as either the coil or magnet moves. When the strength of the crash, that is the voltage exceeds a predetermined value, a safety device such as, for example, ON-OFF operation of an air bag ignition circuit is operated.

7 Claims, 2 Drawing Figures

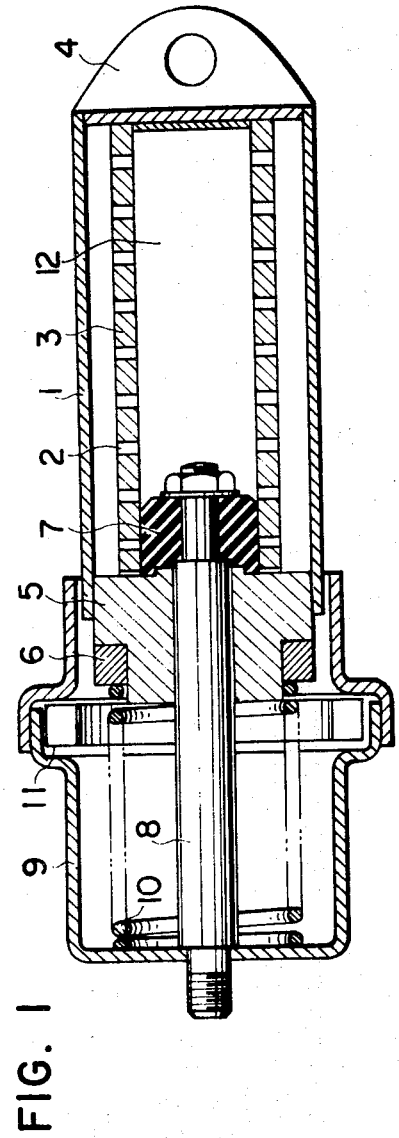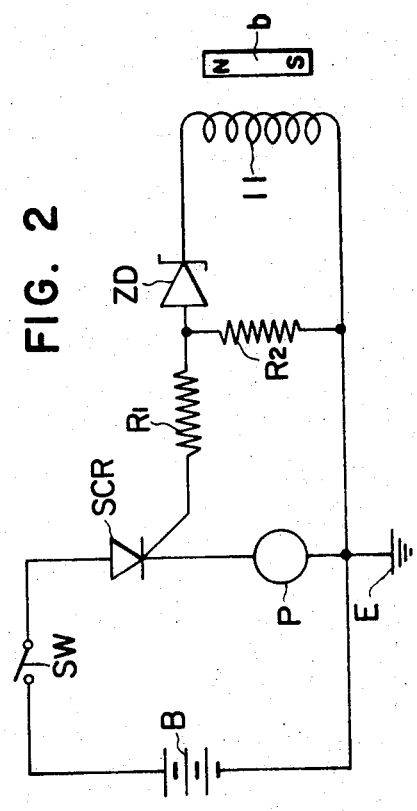

3,830,329

1

CRASH SENSOR

BACKGROUND OF THE INVENTION

1. Field of the Invention

This invention relates to a safety device operative upon collision of a vehicle, and more particularly to a crash speed sensing device for controlling the operation of an air bag system, auto-seatbelt system, ignition circuit system, and particularly to a crash speed detecting device which has means for sensing with a coil and a magnet and a damper for absorbing the energy of the collision integrally constructed.

2. Description of the Prior Art

Heretofore, there has been proposed a method for sensing the collision speed with mechanical or electrical systems. However, the conventional mechanical method has the disadvantage of improper contact of the contact, and the electric method has weak vibration endurability so that it is often destroyed by the collision. Therefore, the conventional sensing device lacks reliability as a safety device and is not actually used.

SUMMARY OF THE INVENTION

It is an object of the present invention to provide a crash speed sensing device for eliminating the disadvantages of the conventional device as a safety device for protecting the passengers on a vehicle upon collision of an automobile such as, for example, for operating an air bag system, auto-seatbelt system, and ignition circuit system.

It is another object of the present invention to provide a crash speed sensing device which has means for sensing the crash speed integral with a damper for absorbing crash energy upon collision of a vehicle.

The present invention is so constructed as to have a generating coil and a magnet associated with a slidable piston and cylinder forming a buffer device for absorbing the collision energy when the vehicle collides so that when the piston and the cylinder slide relative to each other, the generating coil crosses the magnetic flux of the magnet producing a voltage proportional to the sliding speed thereof. When this voltage becomes higher than a predetermined value it causes the operation of a circuit for operating a safety device.

The advantages and objects of the present invention will be apparent from the following description and drawings.

BRIEF DESCRIPTION OF THE DRAWINGS

FIG. 1 is a longitudinal sectional view of one embodiment of the crash speed sensing device of the present invention; and FIG. 2 is a circuit diagram of the device of this invention utilized with an air bag.

DETAILED DESCRIPTION OF THE INVENTION

The present invention will now be described with reference to one embodiment of the present invention shown in the drawings, particularly to FIG. 1, which shows one embodiment of crash speed sensing means provided for an oil damper having an air chamber. An orifice cylinder 3 perforated with a number of small holes 2 and an oil cylinder 1 are fixed at both respective ends to a damper fixing plate 4 and a rod guide 5. A magnet 6 is fixed to the rod guide 5 at the outer periphery thereof. In this embodiment, oil is filled in the damper, but various other gases or liquids may be filled therein. A piston 7 is slidably engaged in the orifice cylinder 3. The piston rod 8 of the piston 7 is projected through the rod guide 5. A spring 10 mounted in compression between the cover 9 fixed to the end of the piston rod 8 and the rod guide 5 always urges to the rod guide side the piston. The generating coil 11 is fixed into the cover 9. In this embodiment, the magnet 6 is fixed to the oil damper cylinder and the generating coil 11 is fixed to the cover 9, that is the piston, but they may be fixed oppositely.

When the automobile collides, so that the piston 7 slides toward the damper fixing plate 4 against the oil damper and the spring 10, the generating coil 11 moves toward the damper fixing plate 4 together with the cover 9 so as to cross the magnetic flux of the magnet 6.

A proper number of the crash speed sensing devices thus constructed are mounted to the bumper of the automobile, and when the vehicle collides, absorbs the collision energy at the same time its colliding speed is detected so as to generate a signal for operating a safety device such as an air bag, auto-seatbelt, etc. In order that the generating coil may not cross the magnetic flux of the magnet 6 except upon collision, they are urged by the spring 10 so as to prevent the generation of an error signal by the vibration of the automobile.

The damper of this invention fills oil 12 in the cylinder 1, and the piston rod 8 and the damper fixing plate 4 are fixed to the bumper and the vehicle, respectively, to be used as the buffer device of the automobile. The piston rod 8 and the damper fixing plate 4 may be fixed to the body and the bumper, respectively.

FIG. 2 shows the circuit utilizing the crash speed detecting device of the present invention to operate an air bag system. Energy for initiator plug P for operating the air bag is connected to the positive electrode of a power source B through silicon controlled rectifier SCR and an ignition switch SW at one end thereof, and is connected to the negative electrode of the power source B at the other end thereof and to electrical ground E.

An electric circuit is formed by the power source B, ignition switch SW, silicon controlled rectifier SCR, (anode terminal, cathode terminal) and initiator plug P. The generating coil 11 is connected to one end of the gate terminal of the silicon controlled rectifier SCR through the constant voltage diode ZD, such as a Zener diode, and resistor $R_1$, and is also connected at the other end to one electrode of the power source B. The generating coil 11 is thereby connected in parallel to the initiator plug P. The resistor $R_2$ is connected at one end between the resistor $R_1$ and the constant voltage diode ZD, and is also connected at the other end to ground E. The resistors $R_1$ and $R_2$ are for protection.

The constant voltage diode ZD has the characteristic of increasing the electric current abruptly when the voltage applied across its terminals exceeds a predetermined voltage or Zener voltage. The silicon controlled rectifier SCR prevents the electric current from flowing in the normal direction until a triggering current is applied to the gate, and allows the flow of current in normal direction, similar to a normal rectifying element, after the signal is applied to the gate.

When an automobile having the damper of this invention collides, the piston rod 8 moves toward the damper fixing plate 4 against the spring 10 and the resistance of the oil in the cylinder, in response to the strong pressure applied to the bumper. The higher the moving speed of the piston rod 8 is, the higher the crash speed is. Since the magnetic flux of the magnet 6 crosses the path of the generating coil 11 fixed to the cover 9 at right angles a voltage is generated in the generating coil 11. The generated voltage is proportional to the speed of the coil as it crosses the magnetic flux, and the faster the speed, the higher the generated voltage becomes. When the generating voltage exceeds the zener voltage of the constant voltage diode ZD in response to the collision speed, a current is introduced to the gate terminal of the silicon controlled rectifier SCR to turn it on allowing current to flow through the initiator plug P. Then, the initiator plug P operates the initiator (not shown) such as a gas bomb, etc., to supply the gas to the air bag to expand it. Therefore, the passenger in the vehicle upon collision, contacts the expanded air bag without contacting the vehicle. The collision energy thereat is absorbed by the expanded air bag, and the passengers are protected from injury.

What is claimed is:

1. A crash speed sensing device for actuating a vehicle safety apparatus and absorbing the energy of a collision upon the occurrence of a collision comprising:
   a. a damper means mounted on the vehicle and comprising a cylinder means and a piston means for absorbing the energy of a collision,
   b. a sensing device integral with the damper means and comprising a magnet and a coil for sensing the crash speed of a collision,
   c. one of said magnet and said coil being disposed on the cylinder means of the damper means and the other of said magnet and said coil being disposed on the piston means of the damper means in order that the coil crosses the magnetic flux of said magnet in response to the relative movement of said cylinder means and said piston means upon collision of the vehicle to generate a voltage proportional to the collision speed, and
   d. a control circuit for operating the vehicle safety apparatus when said coil generates a voltage exceeding a predetermined value.

2. A crash speed sensing device as claimed in claim 1, further comprising a spring provided between said piston means and said cylinder means for urging said piston member against said cylinder means in order to prevent relative movement thereof except upon collision.

3. A crash speed sensing device as claimed in claim 1, wherein said crash speed sensing device is fixed between the vehicle body and a bumper mounted on said vehicle.

4. The crash speed sensing device of claim 1 wherein said magnet is fixed to said cylinder and said coil is fixed to said piston.

5. The crash speed sensing device of claim 4 wherein said device is attached to a vehicle between the vehicle bumper and the vehicle body further comprising a vehicle safety apparatus, said control circuit comprising a power source, a safety apparatus initiator plug and an electrically activated switch means, responsive to said electrical signal of at least a predetermined value for causing power from said power source to be supplied to said initiator plug in response to a collision of at least a predetermined magnitude.

6. The crash speed sensing device of claim 5, wherein said electrically activated switch means comprises a silicon control rectifier connected in series with the power source and said safety apparatus initiator plug, said coil being connected to the gate electrode of said silicon control rectifier and in parallel with said safety apparatus initiator plug.

7. The crash speed sensing device of claim 6 further comprising a constant voltage diode connected between one end of said coil and the gate electrode of said silicon control rectifier.

* * * * *